United States Patent
Eagle

[11] Patent Number: 6,095,494
[45] Date of Patent: Aug. 1, 2000

[54] RISING STEM TAP OF PLASTIC, PREFERABLY WITH A METAL THREADED INSERT

[75] Inventor: John Joseph Eagle, Oakland Park, Australia

[73] Assignee: Caroma Industries Limited, Queensland, Australia

[21] Appl. No.: 09/254,511

[22] PCT Filed: Sep. 19, 1997

[86] PCT No.: PCT/AU97/00620

§ 371 Date: May 18, 1999

§ 102(e) Date: May 18, 1999

[87] PCT Pub. No.: WO98/12460

PCT Pub. Date: Mar. 26, 1998

[30] Foreign Application Priority Data

Sep. 19, 1996 [AU] Australia ................... PO2417
Sep. 19, 1996 [AU] Australia ................... PO2418

[51] Int. Cl.[7] ................. F16K 31/44; F16K 51/00; F16K 43/00
[52] U.S. Cl. ................. 251/215; 251/284; 137/315
[58] Field of Search ................. 137/454.5, 454.6, 137/315; 285/239, 389; 251/148, 230, 274, 215

[56] References Cited

U.S. PATENT DOCUMENTS

| | | |
|---|---|---|
| 3,788,601 | 1/1974 | Schmitt ................. 251/284 |
| 4,493,338 | 1/1985 | Petrusson . |
| 4,699,170 | 10/1987 | Diephuis ................. 137/454.5 |
| 4,700,736 | 10/1987 | Sheen ................. 137/315 |
| 4,714,278 | 12/1987 | Gassmann et al. ................. 251/148 |
| 4,799,646 | 1/1989 | Rollett ................. 251/88 |
| 5,050,633 | 9/1991 | Tarnay et al. ................. 251/368 |
| 5,566,708 | 10/1996 | Hobbs, Jr. ................. 251/148 |
| 5,580,031 | 12/1996 | Lorch . |

FOREIGN PATENT DOCUMENTS

| | | |
|---|---|---|
| 248724 | 12/1987 | European Pat. Off. . |
| 2664014 | 1/1992 | France . |
| 1464724 | 2/1977 | United Kingdom . |

*Primary Examiner*—Joseph A. Kaufman
*Assistant Examiner*—David A. Bonderer
*Attorney, Agent, or Firm*—Merchant & Gould P.C.

[57] ABSTRACT

A tap body (1) comprising a plastic shroud (6), a substantially plastics tap spindle (7), and a locking collar (12). The body (1) has an inner threaded portion (18) and the spindle (7) is threadably received in the inner threaded portion (18) and rotatably reciprocable in tap opening and closing directions. The collar (12) engages with the shroud (6) to limit the tap opening rotation of the spindle (7). The insert (18) may be plastic and integral with shroud (6): (see FIG. 6). Shroud (6) may be integral with tap seat, inlet and outlet spigot (see FIGS. 7–9).

22 Claims, 6 Drawing Sheets

RISING STEM TAP OF PLASTIC, PREFERABLY WITH A METAL THREADED INSERT

FIELD OF THE INVENTION

The present invention relates to taps and, in particular, to a tap body which is able to be fabricated from predominantly plastics material thereby substantially reducing the weight and cost of the tap relative to conventional taps.

BACKGROUND OF THE INVENTION

Conventional taps are fabricated from brass or similar non-corrosive material and include a tap body having a threaded mounting spigot at one end and a stuffing box at the other end. Suitably engaged, by means of a relatively course thread, with the interior of the tap body is a tap spindle which is screwed into the tap body by passing the shaft of the tap spindle through the mounting spigot and through the stuffing box before engaging the threaded exterior of the tap spindle with the threaded interior of the tap body.

After this installation has been completed, the stuffing box (which contains compressible material) is screwed further towards the tap body so as to compress the compressible material against the shaft of the spindle. This provides the desired watertight seal between the interior of the tap body and the shaft of the spindle.

The foregoing arrangement has been in use for many years and provides many advantages, particularly in terms of strength and durability. However, the arrangement suffers from a number of disadvantages, the most important of which is that the stuffing box begins to leak progressively over the years and if not re-tightened results in water moving up the shaft of the tap spindle when the tap is open. This can lead to significant deterioration and corrosion of other components, for example mounting boards adjacent the sink into which the tap is positioned, and so on.

In addition, as the cost of metal, brass in particular, increases, so the cost of the tap increases. If the tap body could be made predominantly of plastics material, then a substantial saving in both weight and cost could be achieved.

A search conducted after the priority date located U.S. Pat. No. 4,493,338 assigned to Waltec, Inc. of Canada and U.S. Pat. No. 5,580,031 assigned to Hans Grohe GmbH & Co. KG of Germany.

Both of these documents disclose tap body assemblies comprising metal components and suffer the disadvantages described above.

The present invention is directed towards the above ends with a view to substantially reducing the above disadvantages and/or substantially achieving the above advantages.

SUMMARY OF THE INVENTION

In accordance with a first aspect of the present invention there is disclosed a tap body comprising a first inner threaded portion, a plastics shroud surrounding said inner threaded portion, a substantially plastics tap spindle threadably received in said first inner threaded portion and rotatably reciprocable in tap opening and tap closing directions, and a locking collar engageable with said shroud to limit the tap opening rotation of said spindle.

Preferably, the body has a smooth bore, and the spindle has a valve carrier including a sealing means which is adapted to slidably engage said bore to provide a seal between said spindle and body.

BRIEF DESCRIPTION OF THE DRAWINGS

Preferred embodiment of the present invention will now be described with reference to the drawings in which.

DESCRIPTION OF THE PREFERRED EMBODIMENT

Figure 1:
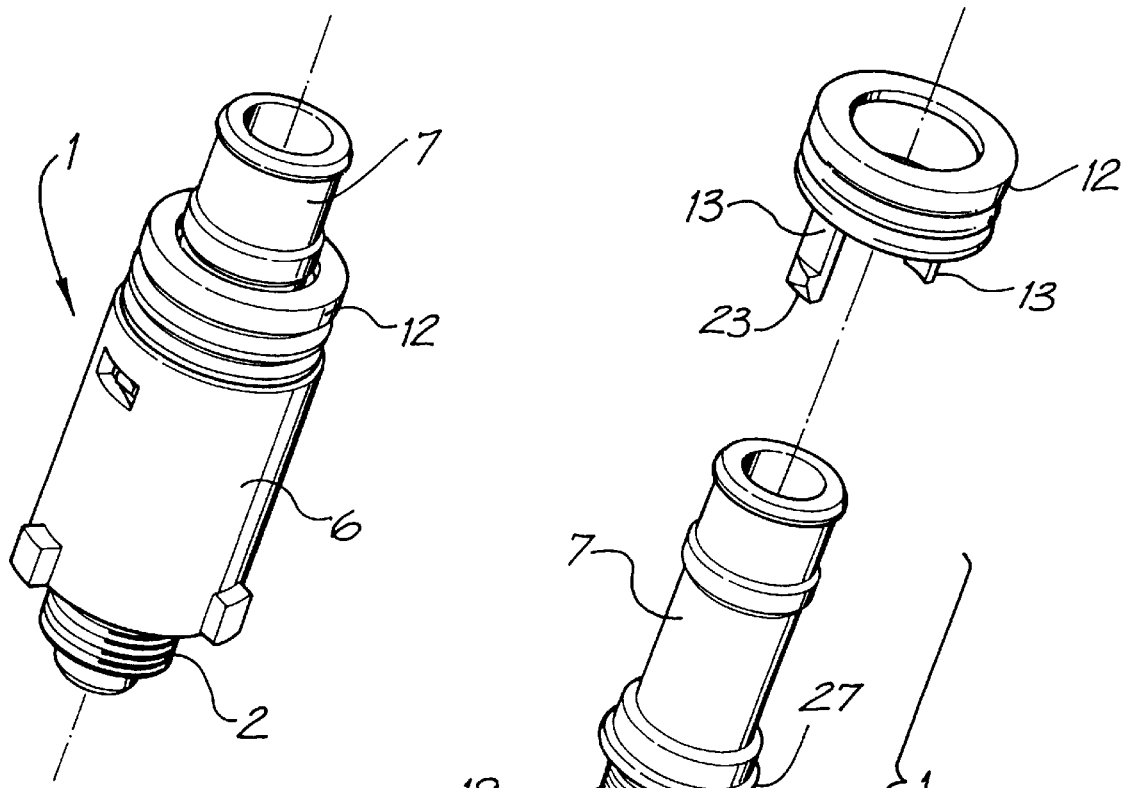
FIG. 1 is a perspective view of the assembled tap body of the first preferred embodiment.
Figure 2:
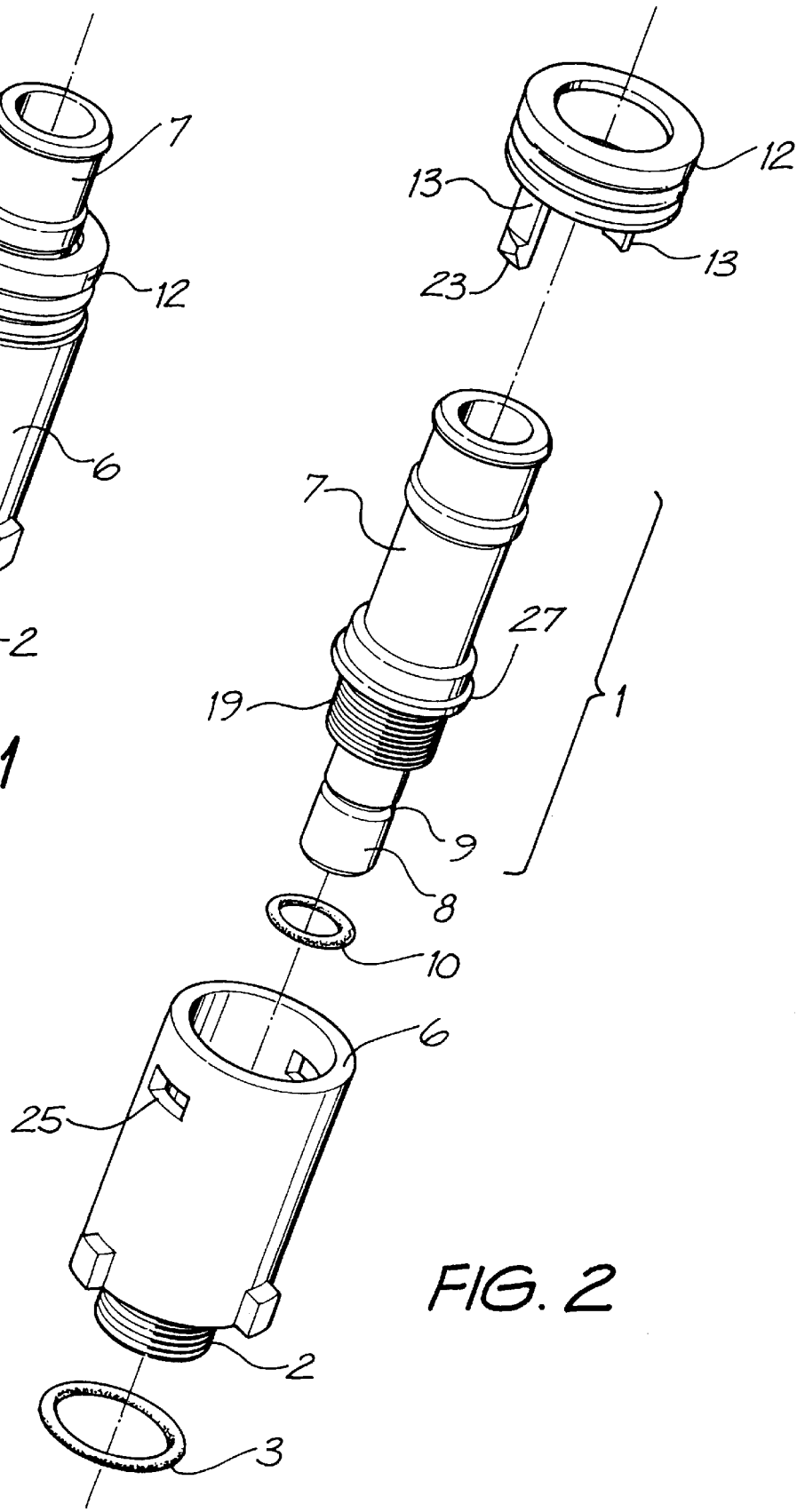
FIG. 2 is an exploded perspective view of the tap body of FIG. 1.
Figure 3:
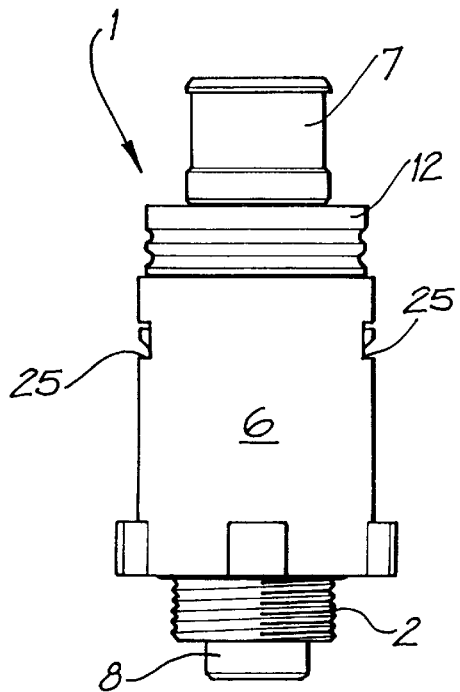
FIG. 3 is a side elevational view of the tap body of FIG. 1.

As seen in FIGS. 1 and 2 in particular, the first embodiment of the tap body 1 has a threaded mounting spigot 2 which is of conventional size and thread configuration so as to permit the tap body 1 to be engaged with a conventional tap seat (not illustrated). As indicated in FIG. 2 a sealing O-ring 3 passes over the mounting spigot 2 so as to provide a watertight seal between the tap body 1 and the tap seat (not illustrated).

The mounting spigot 2 is itself part of a brass sleeve 5 (best seen in FIG. 4) which is positioned within a plastic shroud 6. A plastic spindle 7 is located within the tap body and has a valve carrier 8 at one (lower) end which has a groove 9 to receive an O-ring 10. The other end of the spindle 7 opposite the valve carrier 8 is ultimately connected to the handle (not illustrated) of the tap.

A locking collar 12 having a pair of opposed legs 13, 14 is snap-engageable with the shroud 6 so as to limit the movement of the spindle 7 as will be explained hereafter.

Figure 4:
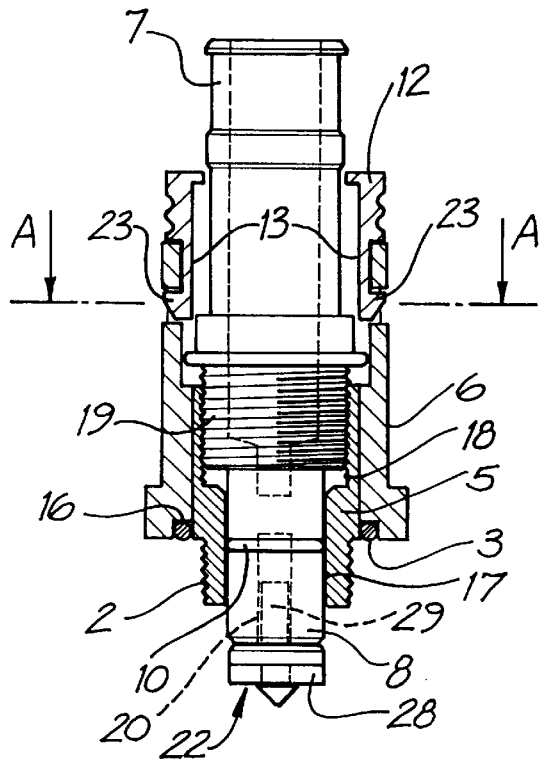
FIG. 4 is a longitudinal cross-section through the tap body of FIG. 3.

As best seen in FIG. 4, the brass sleeve 5 is provided with a knurled exterior and is placed into the mould prior to injection of the plastics from which the shroud 6 is formed. As a consequence, there is a good key between the brass of the sleeve 5 and the plastics of the shroud 6. At the time of moulding the shroud 6 a groove 16 is formed which receives the sealing O-ring 3. It will also be apparent from FIG. 4 that the interior of the mounting spigot 2 has a smooth bore 17 which therefore provides a good seal together with the O-ring 10 thereby sealing the spindle 7 relative to the sleeve 5.

In addition, the sleeve 5 has an interior threaded portion 18 which mates with a corresponding threaded portion 19 on the spindle 7. The inter-engagement of the two threaded portions 18 and 19 permits the spindle 7 to be rotated within the valve body 1 so as to move the valve carrier 8 relative to the mounting spigot 2. The valve carrier 8 also includes a recess 20 for locating a conventional jumper valve 22 having a disc shaped washer 28 and a stem 29 which is received in the recess 20.

The spindle 7 can be inserted into the tap body 1 by means of passing the threaded portion 19 through the top of the shroud 6 as indicated in FIG. 2. The spindle 7 is then rotated in the tap closing direction so as to move the threaded portion 19 towards the spigot 2. With the entire tap assembled, this tap closing movement of the spindle 7 is brought to an end because of engagement of the washer 28 of the jumper valve 22 with the valve seat in the tap seat (not illustrated).

However, in order to prevent rotation of the spindle 7 in the tap opening direction inadvertently removing the tap spindle 7 from the shroud 6, the locking collar 12 is provided. As best seen in FIGS. 2 and 4, the legs 13 of the locking collar 12 include cammed wedges 23 which snap engage into rectangular openings 25 in the shroud 6. An outer peripheral lip 27 on the spindle 7 engaged with the distal ends of the legs 13 to limit the movement of the spindle 7 in the tap opening direction.

Figure 5:
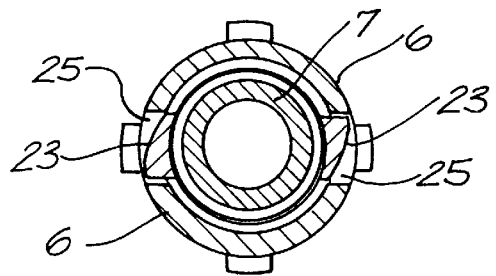
FIG. 5 is a transverse cross-sectional view along the line A—A of FIG. 1.

As best seen in relation to FIG. 5, the locking collar 12 can be rotated clockwise in order to deflect inwardly the legs 13 to thereby permit the locking collar 12 to be withdrawn from the shroud 6 if the tap body 1 should be required to be disassembled.

The above described arrangement provides a number of substantial advantages. Firstly, the tap body 1 is predominantly formed from lightweight and inexpensive plastics material and therefore is overall lightweight and low cost construction. The brass sleeve 5 provides for good dimensional tolerance for the bore 17 thereby ensuring a good seal between the shroud 6 and spindle 7. The tap body 1 is able to be retrofitted to existing taps since the arrangement of the conventional jumper valve 22 and tap seat remain unchanged. The plastics tap spindle 7 is preferably provided with the torque limiting clutch described in co-pending Australian Patent Application No. P 02416 (attorney reference 277596) the disclosure of which is hereby incorporated herein by means of cross-reference. The main advantage of this arrangement is to limit the torque which can be applied to the plastics spindle 7 via the handle (not illustrated).

Figure 6:
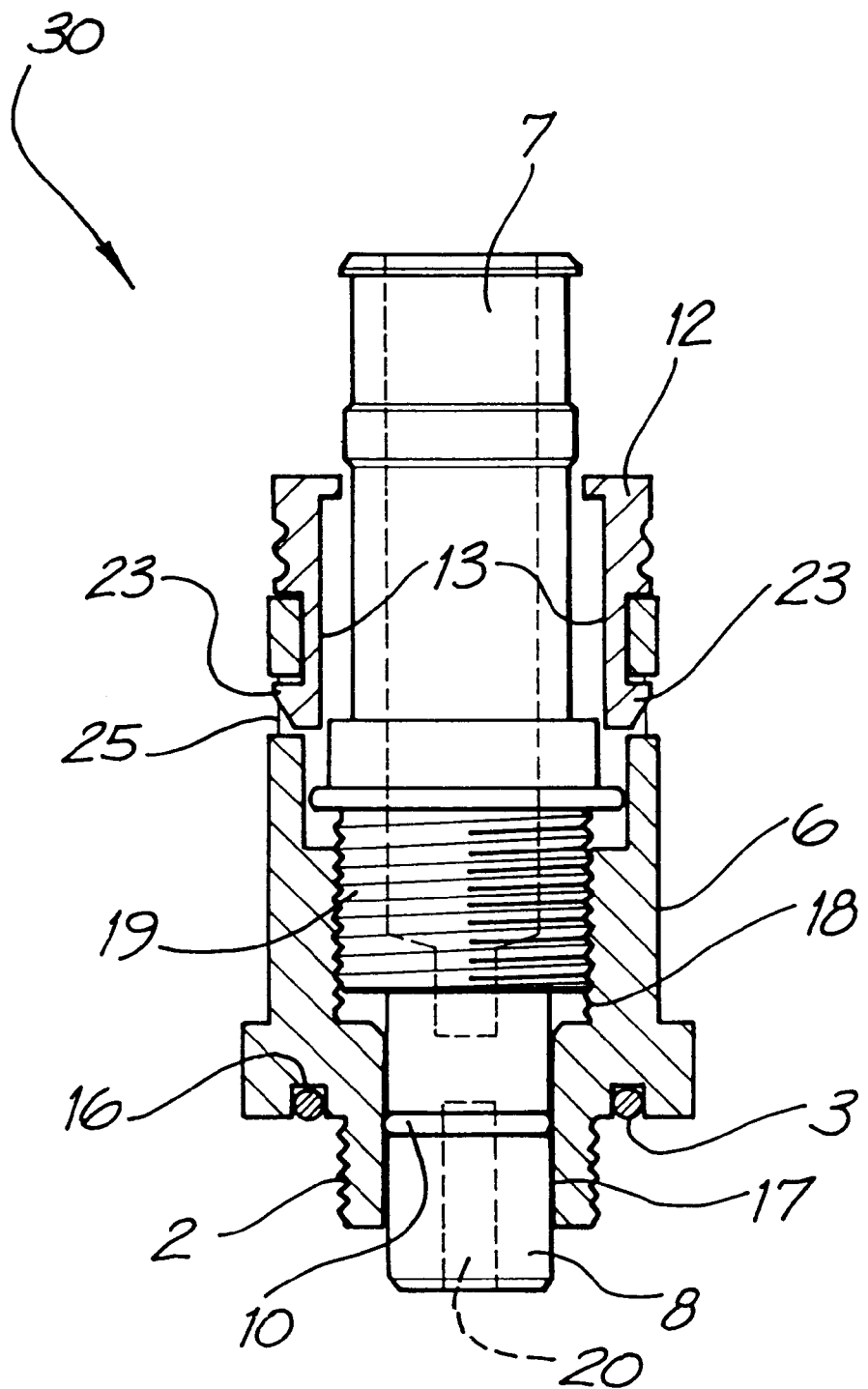
FIG. 6 is a longitudinal cross-section through the assembled tap body of the second preferred embodiment.

FIG. 6 shows a second embodiment of the tap body 30. Like reference numerals to those used in describing the first embodiment denote like features in the second embodiment.

In this second embodiment, the brass sleeve is omitted by moulding the mounting spigot 2 integral with the plastics shroud 6. The smooth bore 17 and interior threaded portion 18 can be either molded or machined into the shroud 6.

Whilst, the first embodiment is best suited to installing plastic tapware onto existing brass plumbing fixtures, the second embodiment is best suited to plumbing installations using predominantly plastics fittings.

Figure 7:
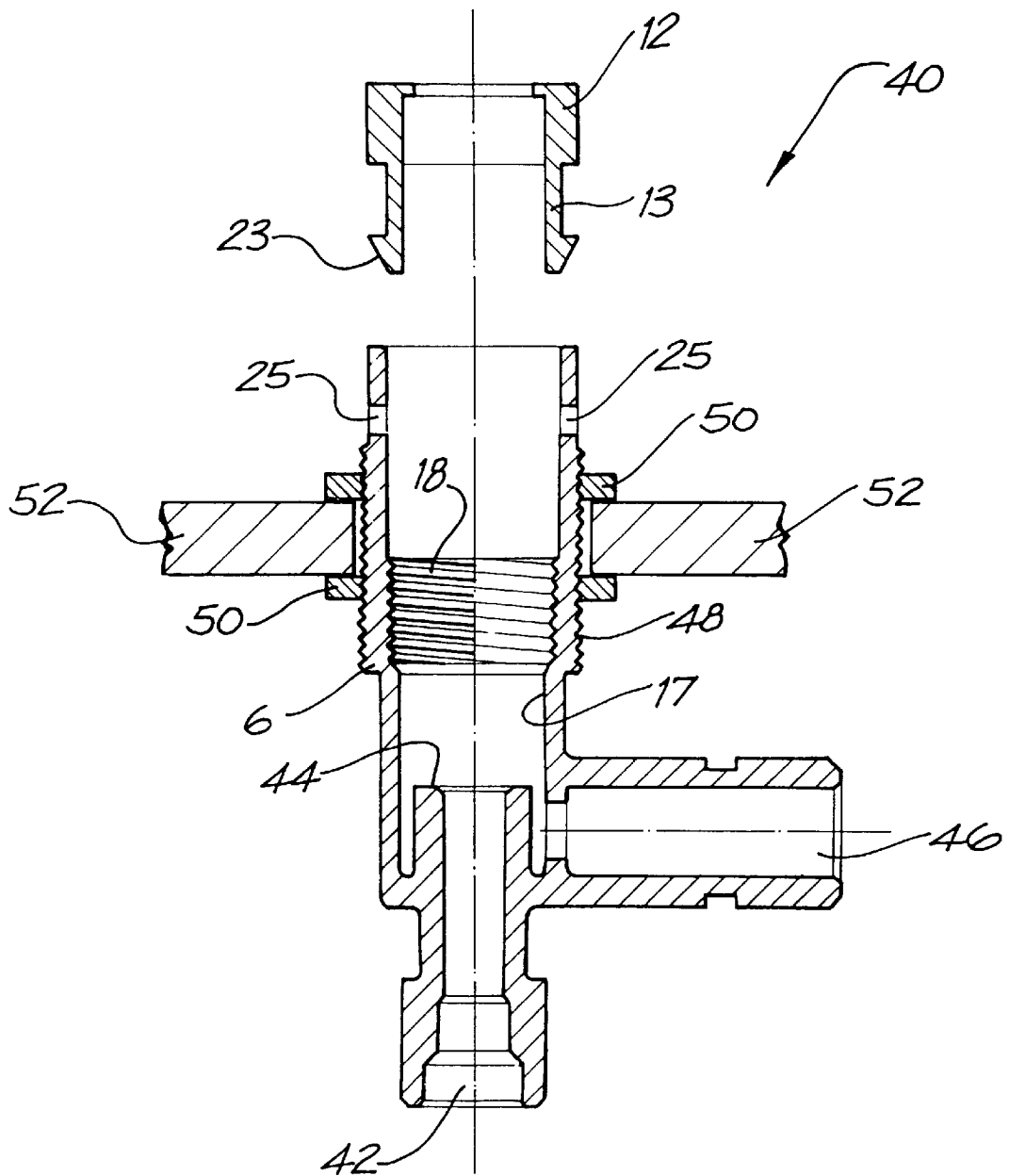
FIG. 7 is a longitudinal cross-section through the tap body and locking collar of the third preferred embodiment.

FIG. 7 shows a third embodiment of the tap body 40 for use in three hole (tap, spout, tap) installations adjacent basins, baths and the like. Like numerals will again be used for like features.

The tap body 40 includes a mains inlet 42 in fluid communication with a valve seat 44 which is opened and closed by the jumper valve (not shown) to selectively communicate water to a tap outlet spigot 46. The outlet spigot 46 is connected to a spout T-piece (not shown).

As with the second embodiment, the smooth bore 17 and interior threaded portion 18 are incorporated into the plastics shroud 6. The shroud 6 also includes an exterior threaded portion 48. Locking nuts 50 engage the threaded portion 48 and permit the tap body to be fastened to a basin surround 52 or the like.

Figure 8:
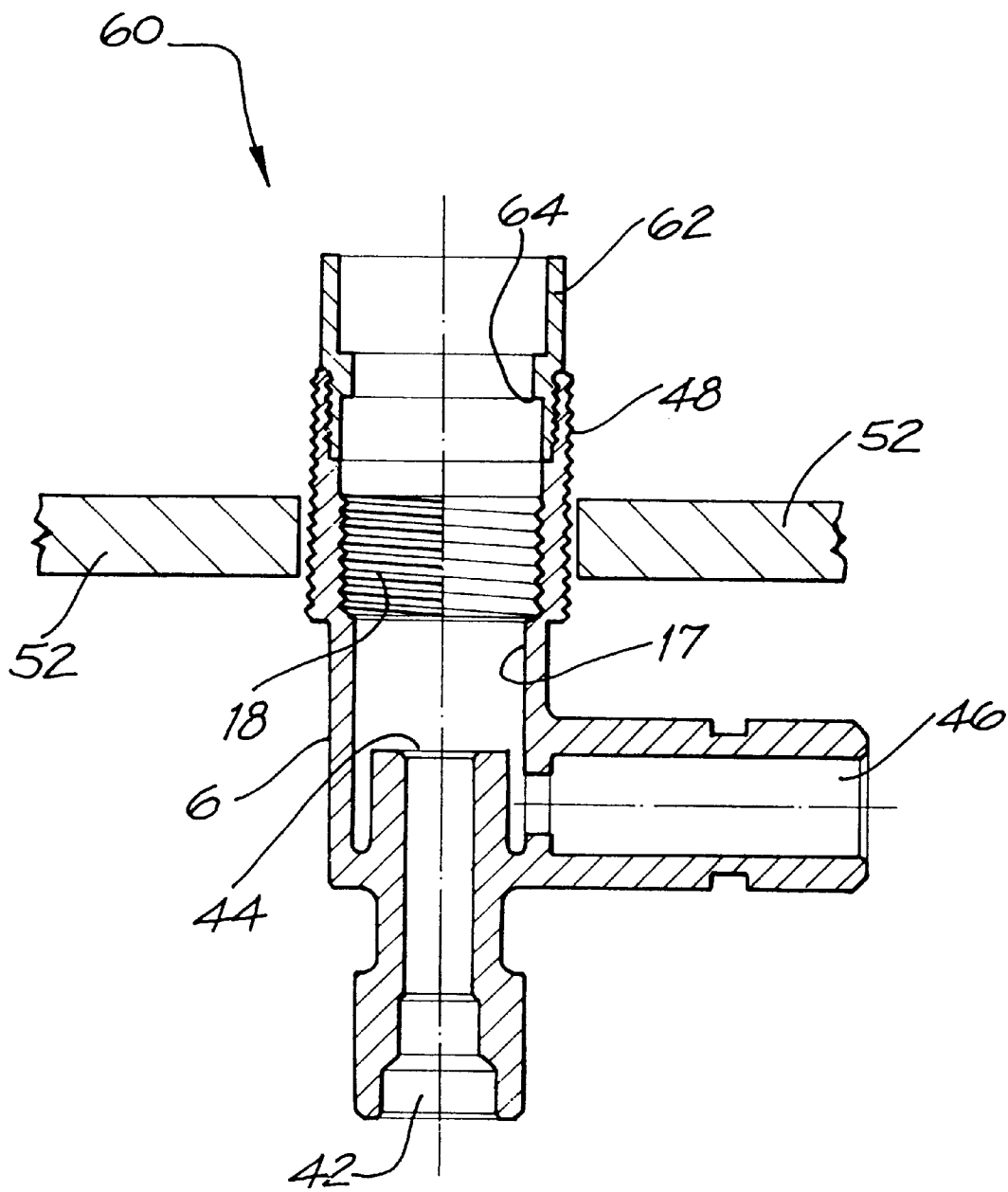
FIG. 8 is a longitudinal cross-section through the tap body and locking collar of the fourth preferred embodiment.

FIG. 8 shows a fourth embodiment of the tap body 60 in which the snap-engaging locking collar 12 is replaced by an externally threaded locking collar 62 which engages a second interior threaded portion 64 provided on the tap end of the shroud 6. The collar 62 has an inner peripheral lip 64 which engages the outer peripheral lip 27 on the spindle 7 to limit the movement of the spindle 7 in the tap opening direction.

Figure 9:
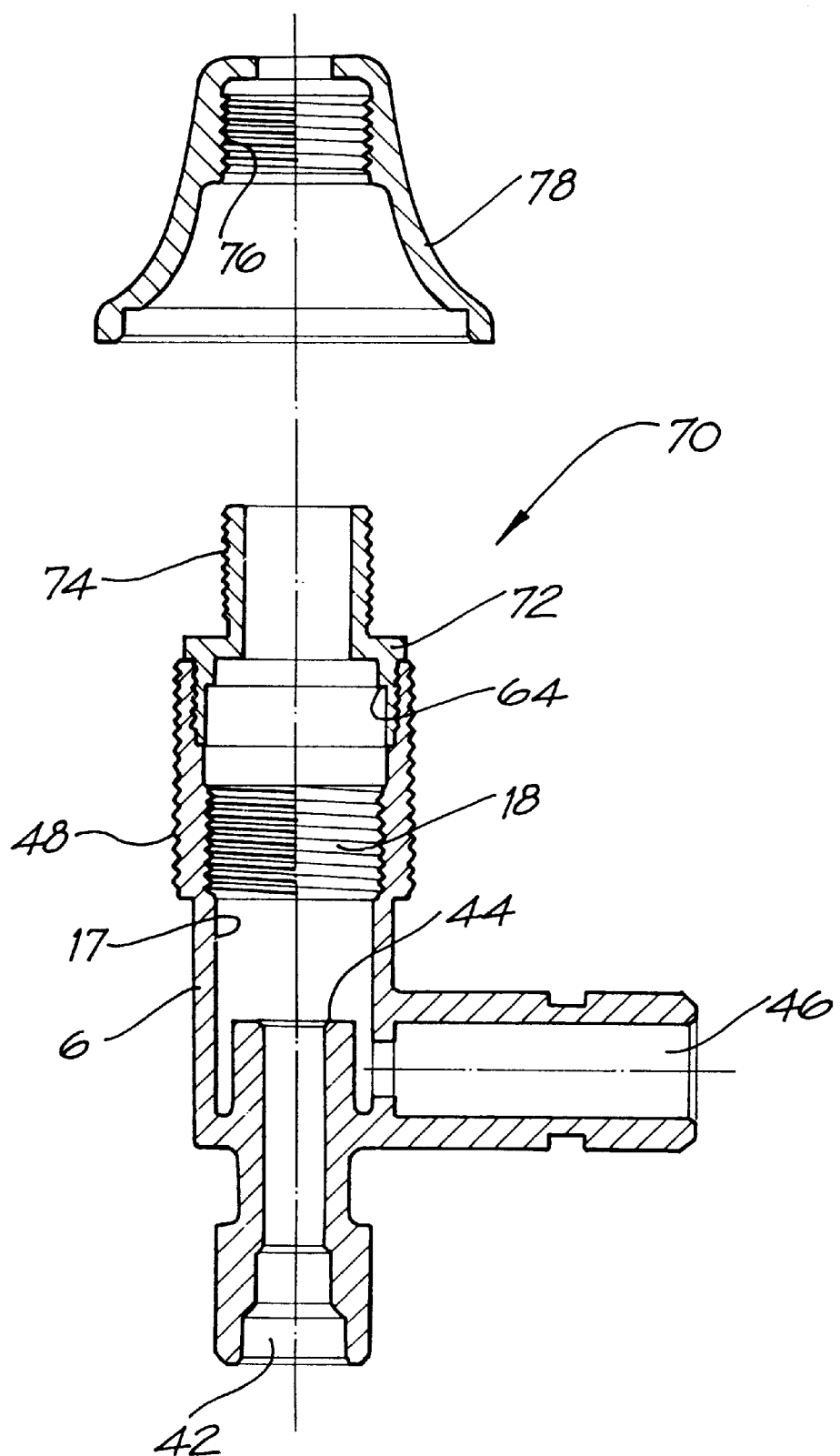
FIG. 9 is a longitudinal cross-section through the tap body, locking collar and tap shroud of the fifth preferred embodiment.

FIG. 9 shows a fifth embodiment of the tap body 70 with a modified threaded locking collar 72 including a threaded spigot 74 for engagement with the interior threaded portion 76 of tap shroud 78.

The foregoing describes only five embodiments of the present invention and modifications, obvious to those skilled in the art, can be made thereto without departing from the scope of the present invention.

What is claimed is:

1. A tap body comprising a first inner threaded portion, a plastics shroud surrounding said inner threaded portion, a substantially plastics tap spindle threadably received in said first inner threaded portion and removably reciprocable in tap opening and tap closing directions, and a locking collar engageable with said shroud to limit the tap opening rotation of said spindle.

2. A tap body as claimed in claim 1, wherein said body has a smooth bore, and said spindle has a valve carrier including a sealing means adapted to slidably engage said bore to provide a seal between said spindle and body.

3. A tap body as claimed in claim 2, wherein said sealing means is an O-ring and said valve carrier includes a groove adapted to receive and locate said O-ring.

4. A tap body as claimed in claim 1, further comprising a mains water inlet and an outlet spigot.

5. A tap body as claimed in claim 1, further comprising an outer threaded portion comprising a mounting arrangement for said body.

6. A tap body as claimed in claim 5, wherein the outer threaded portion is integrally formed with the plastics shroud.

7. A tap body as claimed in claim 6, wherein the first inner threaded portion is integrally formed with the plastics shroud.

8. A tap body as claimed in claim 1, further comprising a metal sleeve, wherein said outer threaded portion is formed integrally with the metal sleeve and said plastics shroud surrounds said metal sleeve except said outer threaded portion.

9. A tap body as claimed in claim 8, wherein the first inner threaded portion is integrally formed with said metal sleeve.

10. A tap body as claimed in claim 8, wherein said plastics shroud is moulded around said metal sleeve to fix said shroud thereto.

11. A tap body as claimed in claim 10, wherein the exterior of the metal sleeve is knurled to improve keying between the metal sleeve and the plastics shroud whilst moulding.

12. A tap body as claimed in claim 8, wherein said sleeve is brass.

13. A tap body as claimed in claim 5, wherein the end of the shroud adjacent the proximal end of the outer threaded portion includes a groove adapted to receive and locate an O-ring.

14. A tap body as claimed in claim 1, wherein said plastics shroud includes at least one opening therein and said collar includes at least one leg terminating in a wedge adapted to snap engage the opening.

15. A tap body as claimed in claim 14, wherein said wedge includes an exterior radially cammed face adapted to, upon rotation of the locking collar, abut an edge of the opening and force said leg radially inwardly to release the wedge from engagement with the opening.

16. A tap body as claimed in claim 14, wherein the plastics spindle includes a outer peripheral lip adapted to abut against the distal end of the leg to limit the tap opening rotation of the spindle.

17. A tap body as claimed in claim 14, wherein said plastics shroud includes two opposed openings and said collar includes two correspondingly opposed legs.

18. A tap body as claimed in claim 1, wherein the plastics spindle includes an externally threaded portion adjacent the valve carrier and adapted to threadably engage the first inner threaded portion.

19. A tap body as claimed in claim 1, wherein the valve carrier includes a cylindrical recess adapted to receive the stem of a jumper valve.

20. A tap body as claimed in claim 1, wherein the tap end of said plastics shroud includes a second inner threaded portion and said locking collar includes an outer threaded portion adapted to threadably engage the second inner threaded portion.

21. A tap body as claimed in claim 20, wherein said locking collar includes an inner peripheral lip and the plastics spindle includes an outer peripheral lip adapted to abut against the inner peripheral lip to limit the tap opening rotation of the spindle.

22. A tap body as claimed in claim 20, wherein the locking collar includes a distal outer threaded portion adapted to threadably engage an inner threaded portion of a tap shroud.

* * * * *

UNITED STATES PATENT AND TRADEMARK OFFICE
CERTIFICATE OF CORRECTION

PATENT NO. : 6,095,494
DATED : August 1, 2000
INVENTOR(S) : Eagle

It is certified that error appears in the above-identified patent and that said Letters Patent is hereby corrected as shown below:

Column 4,
Line 19, "removably" should read -- rotatably --

Signed and Sealed this

Twenty-ninth Day of October, 2002

Attest:

Attesting Officer

JAMES E. ROGAN
Director of the United States Patent and Trademark Office